United States Patent
Chiu

(10) Patent No.: US 10,230,297 B2
(45) Date of Patent: Mar. 12, 2019

(54) HIGH-VOLTAGE STARTUP CIRCUITS AND CONTROL METHODS THEREOF

(71) Applicant: Leadtrend Technology Corporation, Zhubei, Hsinchu County (TW)

(72) Inventor: Kuo-Chin Chiu, Zhubei (TW)

(73) Assignee: LEADTREND TECHNOLOGY CORPORATION, Zhubei, Hsinchu County (TW)

( * ) Notice: Subject to any disclaimer, the term of this patent is extended or adjusted under 35 U.S.C. 154(b) by 0 days.

(21) Appl. No.: 16/028,451

(22) Filed: Jul. 6, 2018

(65) Prior Publication Data

US 2019/0020266 A1  Jan. 17, 2019

(30) Foreign Application Priority Data

Jul. 14, 2017  (TW) .............................. 106123563 A

(51) Int. Cl.
  *H02M 3/335* (2006.01)
  *H02M 1/36* (2007.01)
(52) U.S. Cl.
  CPC ......... *H02M 1/36* (2013.01); *H02M 3/33507* (2013.01); *H02M 3/335* (2013.01)
(58) Field of Classification Search
  CPC ..... H02M 1/36; H02M 3/335; H02M 3/33507
  See application file for complete search history.

(56) References Cited

U.S. PATENT DOCUMENTS

| | | | |
|---|---|---|---|
| 2004/0145924 A1* | 7/2004 | Jang | H02M 1/36 363/20 |
| 2013/0021013 A1* | 1/2013 | Kondou | H02M 1/36 323/283 |
| 2014/0062333 A1* | 3/2014 | Sonobe | H05B 33/0815 315/291 |
| 2015/0124491 A1* | 5/2015 | Tsou | H02M 3/33507 363/21.01 |
| 2016/0156171 A1* | 6/2016 | Xiao | H02M 1/32 361/18 |
| 2016/0164428 A1* | 6/2016 | Chen | G01R 19/0007 307/130 |
| 2016/0359419 A1* | 12/2016 | Lin | H02M 1/08 |
| 2018/0083625 A1* | 3/2018 | Garg | G11C 5/147 |

* cited by examiner

*Primary Examiner* — Fred E Finch, III
*Assistant Examiner* — Rafael O. De León Domenech
(74) *Attorney, Agent, or Firm* — McClure, Qualey & Rodack, LLP

(57) ABSTRACT

A high-voltage startup circuit in an integrated circuit with a high-voltage pin and an operating voltage pin is disclosed, capable of having both low standby power consumption and high-speed transient response. An ultra-high voltage transistor and a main NMOS transistor are connected in series via a joint node between the high-voltage pin and the operating voltage pin. A pull-up circuit controlled by a stop signal is connected between the joint node and a first gate of the main NMOS transistor. A pull-down circuit controlled by the stop signal is connected to the first gate of the main NMOS transistor. When the stop signal is de-asserted the pull-up circuit couples the joint node to the first gate. When the stop signal is asserted the pull-up circuit performs an open circuit and the pull-down circuit pulls down the first gate voltage.

15 Claims, 4 Drawing Sheets

HIGH-VOLTAGE STARTUP CIRCUITS AND CONTROL METHODS THEREOF

CROSS-REFERENCE TO RELATED APPLICATION

This application claims priority to and the benefit of Taiwan Application Series Number 106123563 filed on Jul. 14, 2017, which is incorporated by reference in its entirety.

BACKGROUND

The present disclosure relates generally to high-voltage startup circuits and the control methods thereof for power converters, and more particularly to high-voltage startup circuits that could have very low standby power consumption and high-speed transient response.

FIG. 1 demonstrates a conventional AC-to-DC power converter 10 with a flyback topology. Power controller 12, which is an integrated circuit for example, detects directly or indirectly output voltage $V_{OUT}$ at a secondary side to control power switch MN and regulate the power converted by the transformer with primary winding PRM, secondary winding SEC and auxiliary winding AUX.

Every power converter nowadays is required to consume as less power as possible when it stays at a no-load condition or a light-load condition. When load 14 in FIG. 1 is absent, meaning a no-load condition, power converter 10 consumes power majorly on four circuit portions including snubber 11, high-voltage startup circuit 18 inside power controller 12, the circuitry for continuously detecting output voltage $V_{OUT}$, and power switch MN causing switching loss.

High-voltage startup circuit 18 is substantially in charge of boosting up operating voltage $V_{CC}$ while it is not high enough for the core circuits inside power controller 12 to function properly. Power controller 12 is for example a packaged integrated circuit with high-voltage pin HV, operating voltage pin VCC, driving pin GD and ground pin GND. When the core circuits inside power controller 12 cannot work normally due to an over-low operating voltage $V_{CC}$, high-voltage startup circuit 18 sinks from high-voltage pin HV charging current $I_{CHG}$ to charge operating voltage capacitor C1 via operating voltage pin $V_{CC}$, so as to boost up operating voltage $V_{CC}$. When operating voltage $V_{CC}$ is high enough, high-voltage startup circuit 18 should stop charging current $I_{CHG}$ and consumes as low power as possible.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified. These drawings are not necessarily drawn to scale. Likewise, the relative sizes of elements illustrated by the drawings may differ from the relative sizes depicted.

The invention can be more fully understood by the subsequent detailed description and examples with references made to the accompanying drawings, wherein.

DETAILED DESCRIPTION

Figure 2:
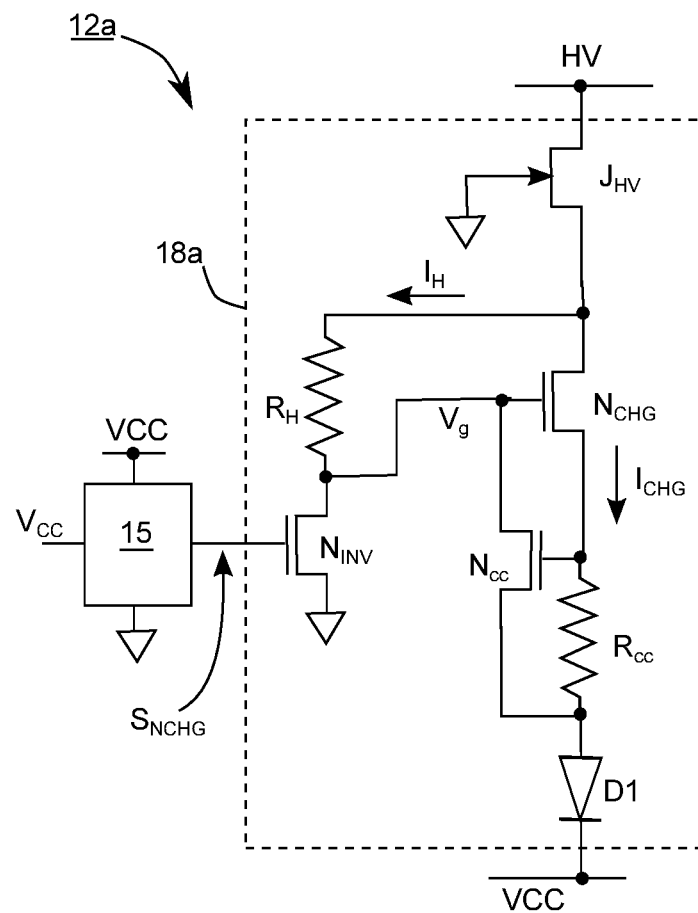
FIG. 2 demonstrates a power controller.

FIG. 2 demonstrates power controller 12a, an integrated circuit for example, including high-voltage startup circuit 18a and startup controller 15. Power controller 12a could embody power controller 12 in FIG. 2. High-voltage startup circuit 18a has junction field effect transistor (JFET) $J_{HV}$, resistors $R_H$ and $R_{CC}$, NMOS transistors $N_{CHG}$, $N_{CC}$ and $N_{HV}$, and diode D1, the connection of which is shown in FIG. 2. JFET $J_{HV}$ is an ultra-high voltage transistor, capable of sustaining an input voltage higher than 400V, so as to tolerate the high voltage occurring at high-voltage pin HV. As shown in FIG. 2, the gate of JFET $J_{HV}$ is directly connected to a ground line, and startup controller 15, using operating voltage $V_{CC}$ as its own power source, detects operating voltage $V_{CC}$.

When startup controller 15 finds operating voltage $V_{CC}$ becomes less than a predetermined bottom limit $V_{BTM}$, 10V for example, startup controller 15 de-asserts stop signal $S_{NCHG}$, making its logic level about 0V and turning OFF NMOS $N_{INV}$. Resistor $R_H$ provides current $I_H$ to pull up gate voltage $V_g$ at the gate of NMOS transistor $N_{CHG}$, which accordingly conducts charging current $I_{CHG}$. Charging current $I_{CHG}$ originates from line voltage $V_{LINE}$ in FIG. 1, flows through resistor $R_S$ in FIG. 1, then goes via in FIG. 2 high-voltage pin HV, JFET $J_{HV}$, NMOS $N_{CHG}$, resistor $R_{CC}$, diode D1, and operating voltage pin VV, and finally charges operating voltage capacitor C1 in FIG. 1. This is so called high-voltage charging, referring to the use of a current conducted directly from a high-voltage power line for charging. Operating voltage $V_{CC}$ ramps up accordingly as high-voltage charging continues. High-voltage charging could cause a lot heat dissipation due to the huge voltage difference between line voltage $V_{LINE}$, 400V for example, and operating voltage $V_{CC}$, 10V for example. Therefore, it is a common practice that high-voltage charging performs only during a startup procedure and stops normally when output voltage is well regulated.

When startup controller 15 finds operating voltage $V_{CC}$ has exceeded a predetermined top limit $V_{TOP}$, 20V for example, it asserts stop signal $S_{NCHG}$, making its logic level about 5V and turning ON NMOS $N_{INV}$, which accordingly pulls low gate voltage $V_g$ and makes NMOS transistor $N_{CHG}$ turned OFF. Therefore, charging current $I_{CHG}$ stops, so does high-voltage charging.

Design for high-voltage startup circuit 18a need consider two technical aspects: transient response when starting high-voltage charging and standby power consumption when high-voltage charging is unnecessary and stopped.

To quicken the transient response of starting high-voltage charging when stop signal $S_{NCHG}$ turns to be de-asserted, resistor $R_H$ must be small in terms of its resistance, so that large current $I_H$ conducted by resistor $R_H$ could quickly boost up gate voltage $V_g$ to turn ON NMOS transistor $N_{CHG}$ within a very short time.

However, to suppress the standby power consumption when high-voltage charging is stopped, resistor $R_H$ must be large in terms of its resistance. When stop signal $S_{NCHG}$ is asserted, JFET $J_H$, resistor $R_H$, and NMOS transistor $N_{INV}$ together construct a leakage path contributing to the standby power consumption. This leakage path conducts small current $I_H$ and consumes little power if resistor $R_H$ is large.

Accordingly, there is a dilemma about how to select the resistance of resistor $R_H$. The choice suffers inevitably in either reduced transient response or increased standby power consumption.

Figure 1:
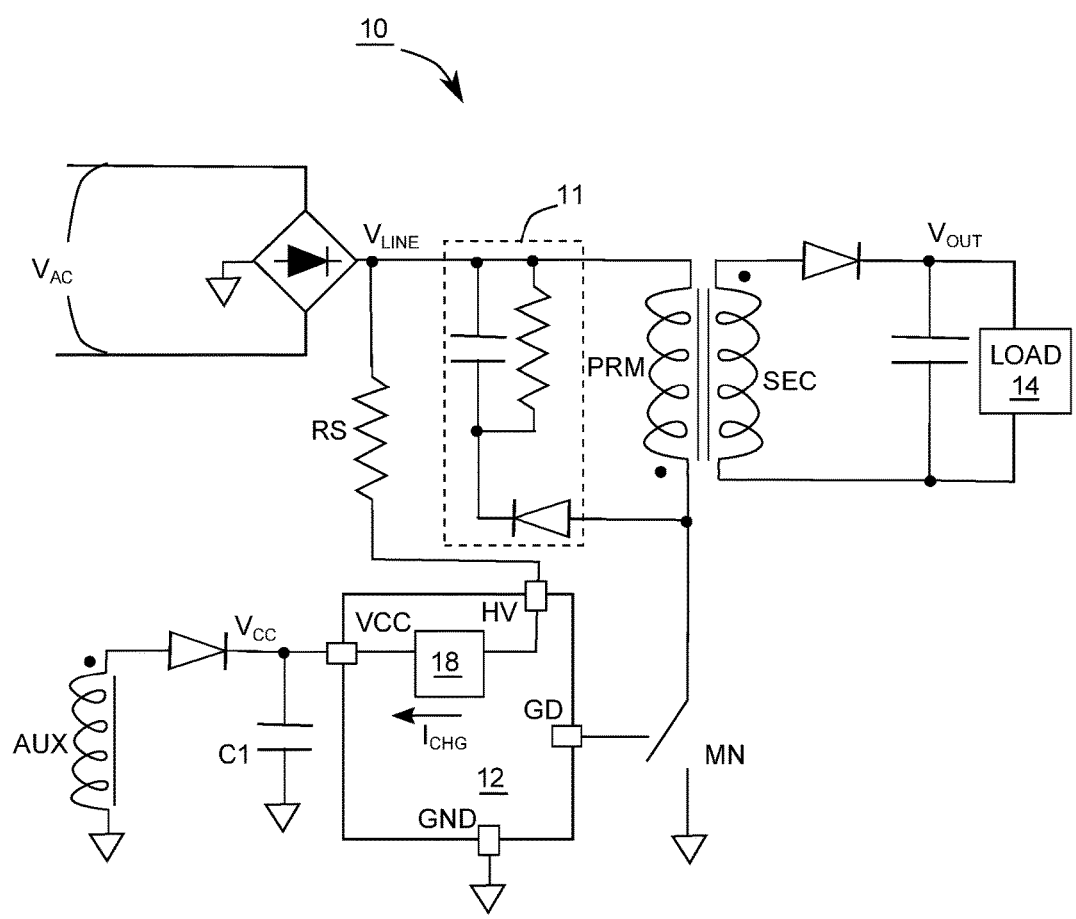
FIG. 1 demonstrates a conventional AC-to-DC power converter 10 with a flyback topology.
Figure 3:
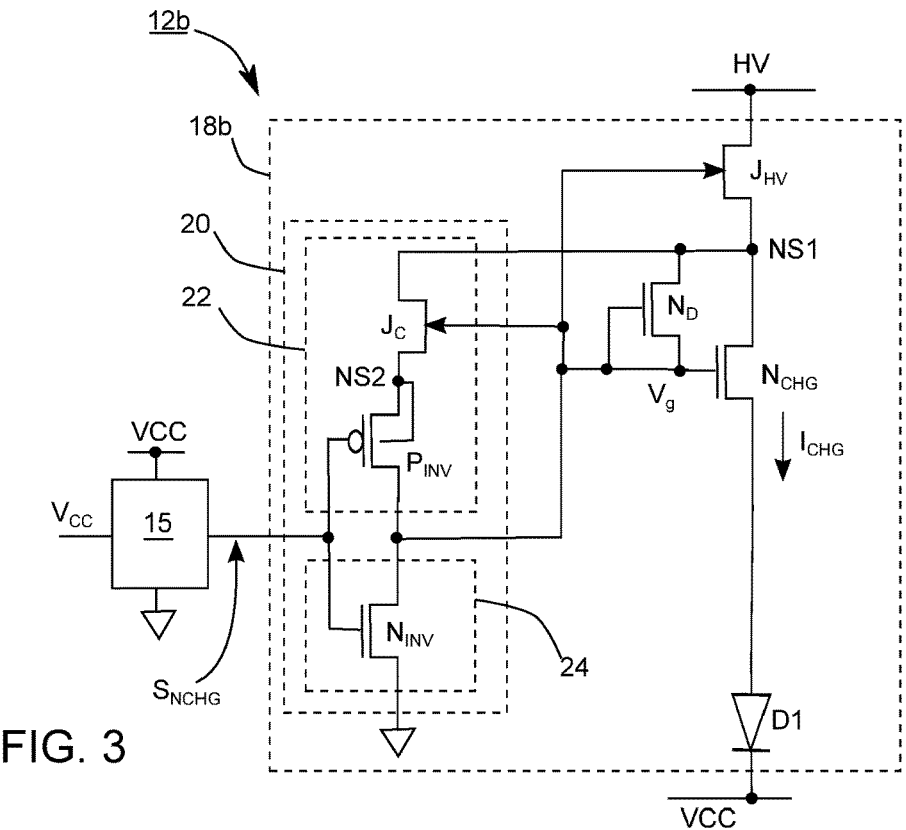
FIGS. 3-6 demonstrate power controllers according to embodiments of the invention.

FIG. 3 demonstrates power controller 12b, which, according to one embodiment of the invention, is an integrated circuit and replaces power controller 12 in FIG. 1. Power controller 12b has high-voltage startup circuit 18b and startup controller 15. High-voltage startup circuit 18b includes JFETs $J_{HV}$ and $J_C$, NMOS transistors $N_{CHG}$, $N_D$ and $N_{INV}$, PMOS transistor $P_{INV}$, and diode D1, connection of which is shown in FIG. 3. JFET $J_{HV}$ and NMOS transistor $N_{CHG}$ are connected in series via joint node NS1 between high-voltage pin HV and operating voltage pin VCC. Startup controller 15, while powered by operating voltage $V_{CC}$, detects operating voltage $V_{CC}$. Unlike FIG. 2, the gate of JFET $J_{HV}$ in FIG. 3 is connected to both the gate of JFET $J_C$ and the gate of NMOS transistor $N_{CHG}$.

NMOS transistor $N_{INV}$, JFET $J_C$ and POMS transistor $P_{INV}$, as being connected, act as inverter 20 receiving stop signal $S_{NCHG}$ from startup controller 15 to control the gate of NMOS transistor $N_{CHG}$. JFET $J_C$ and POMS transistor $P_{INV}$ together are deemed as pull-up circuit 22 for pulling up gate voltage $V_g$ at the gate of NMOS transistor $N_{CHG}$, while NMOS transistor $N_{INV}$ acts as pull-down circuit 24 for pulling down gate voltage $V_g$.

NMOS transistor $N_D$, having its gate connected to its source, acts as a diode reversely connected between joint node NS1 and the gate of NMOS transistor $N_{CHG}$. While it is normally OFF, leakage current of NMOS transistor $N_D$ can charge the gate of NMOS transistor $N_{CHG}$ to slightly pull gate voltage $V_g$ up. In some embodiments of the invention, NMOS transistor $N_D$ is unnecessary and could be omitted.

JFETs $J_{HV}$ and $J_C$ in FIG. 3 have threshold voltages of 20V and 5V respectively. For example, a threshold voltage of a JFET is 20V if its source voltage needs to be 20V more than its gate voltage to turn it OFF. According to some embodiments of the invention, all NMOS and PMOS transistors inside high-voltage startup circuit 18b are high-voltage devices capable of sustaining a voltage drop up to 30V. PMOS transistor $P_{INV}$, as shown in FIG. 3, has an N-type well shorted to the source of PMOS transistor $P_{INV}$, and this N-type well is isolated from any other N-type wells in the same integrated circuit that power controller 12b is formed in. This N-type well of PMOS transistor $P_{INV}$ shorts to the source of PMOS transistor $P_{INV}$, which is also denoted in FIG. 3 as joint node NS2. In other words, the body of PMOS transistor $P_{INV}$ shorts to the source of PMOS transistor $P_{INV}$.

In FIG. 3, when startup controller 15 finds operating voltage $V_{CC}$ is less than a predetermined bottom limit $V_{BTM}$, 10V for example, startup controller 15 de-asserts stop signal $S_{NCHG}$, making its logic level about 0V, so as to turn OFF NMOS transistor $N_{INV}$ and turn ON PMOS transistor $P_{INV}$. As a result, PMOS transistor $P_{INV}$ currently provides a conductive path to short the gate and the source of JFET $J_C$, making JFET $J_C$ turned ON constantly. Pull-up circuit 22, having turned ON PMOS transistor $P_{INV}$ and JFET $J_C$, couples joint node NS1 to the gate of NMOS transistor $N_{CHG}$, to turn ON NMOS transistor $N_{CHG}$ accordingly. Meanwhile, NMOS transistor $N_{INV}$ is turned OFF, performing an open circuit. Charging current $I_{CHG}$ originates from line voltage $V_{LINE}$ in FIG. 1, flows through resistor $R_S$ in FIG. 1, then goes via in FIG. 3 high-voltage pin HV, JFET $J_{HV}$, NMOS $N_{CHG}$, diode D1, and operating voltage pin VCC, and finally charges operating voltage capacitor C1 in FIG. 1, performing high-voltage charging. Operating voltage $V_{CC}$ ramps up accordingly as high-voltage charging continues.

When startup controller 15 in FIG. 3 finds operating voltage $V_{CC}$ has exceeded a predetermined top limit $V_{TOP}$, 20V for example, it asserts stop signal $S_{NCHG}$, making its logic level about 5V to turn ON NMOS $N_{INV}$ and to reduce the current flowing through PMOS transistor $P_{INV}$. Gate voltage $V_g$ accordingly reduces. When Gate voltage $V_g$ is low enough, NMOS transistor $N_{CHG}$ turns off, charging current $I_{CHG}$ stops, so does high-voltage charging.

JFET $J_C$ has a threshold voltage of 5V, substantially no more than the logic level stop signal $S_{NCHG}$ has when stop signal $S_{NCHG}$ is asserted. In other words, when stop signal $S_{NCHG}$ has logic level of 5V, asserted, JFET $J_C$ makes the voltage at joint node NS2 no higher than 5V, so PMOS transistor $P_{INV}$ is firmly turned OFF, decoupling joint node NS1 from the gate of NMOS transistor $N_{CHG}$.

NMOS transistor $N_{CHG}$ is a main NMOS transistor since its conduction condition determines the existence or disappearance of charging current $I_{CHG}$. NMOS transistor $N_{CHG}$ could be replaced by a different kind of transistor, such as a bipolar junction transistor, in other embodiments of the invention.

High-voltage startup circuit 18b in FIG. 3, unlike high-voltage startup circuit 18a in FIG. 2, could have very low standby power consumption when stop signal $S_{NCHG}$ is asserted and high-voltage charging stops. As high-voltage charging stops, joint node NS1 stays at about 20V, and joint node NS2 between JFET $J_C$ and PMOS transistor $P_{INV}$ stays at 5V. In the meantime, JFET $J_C$ makes the voltage at joint node NS2 no more than the gate voltage at the gate of PMOS transistor $P_{INV}$, so PMOS transistor $P_{INV}$ is turned OFF. JFETs $J_{HV}$ and $J_C$, and PMOS transistor $P_{INV}$ all turn OFF, so pull-up circuit 22 becomes an open circuit, decoupling the gate of NMOS transistor $N_{CHG}$ from joint node NS1. Pull-down circuit 24, having NMOS transistor $N_{INV}$ turned ON, pulls gate voltage $V_G$ down to about 0V. The turning OFF of JFET $J_{HV}$ and PMOS transistor $P_{INV}$ evidences that, except the inherent leakage current within turned-off devices, high-voltage startup circuit 18b consumes no power or current at all when high-voltage charging stops.

In FIG. 3, NMOS transistor $N_{INV}$ is turned OFF and PMOS transistor $P_{INV}$ ON when stop signal $S_{NCHG}$ switches from being asserted to being de-asserted. JFET $J_C$, JFET $J_HV$ and NMOS transistor $N_{CHG}$ sequentially follow to be turned ON, so charging current $I_{CHG}$ Occurs, performing high-voltage charging. If PMOS transistor $P_{INV}$ and JFET $J_C$ have large enough driving ability when they are ON, the transient response for starting high-voltage charging could be very quick.

According to the aforementioned analysis, the transient response of high-voltage startup circuit 18b for starting high-voltage charging relies basically on the driving ability of PMOS transistor $P_{INV}$ and JFET $J_C$, which has nothing to do with the standby power consumption of high-voltage startup circuit 18b when high-voltage charging stops. Therefore, it is possible for high-voltage startup circuit 18b to enjoy both high-speed transient response and low standby power consumption, making high-voltage startup circuit 18b suitable for advanced high-voltage startup circuits.

Figure 4:
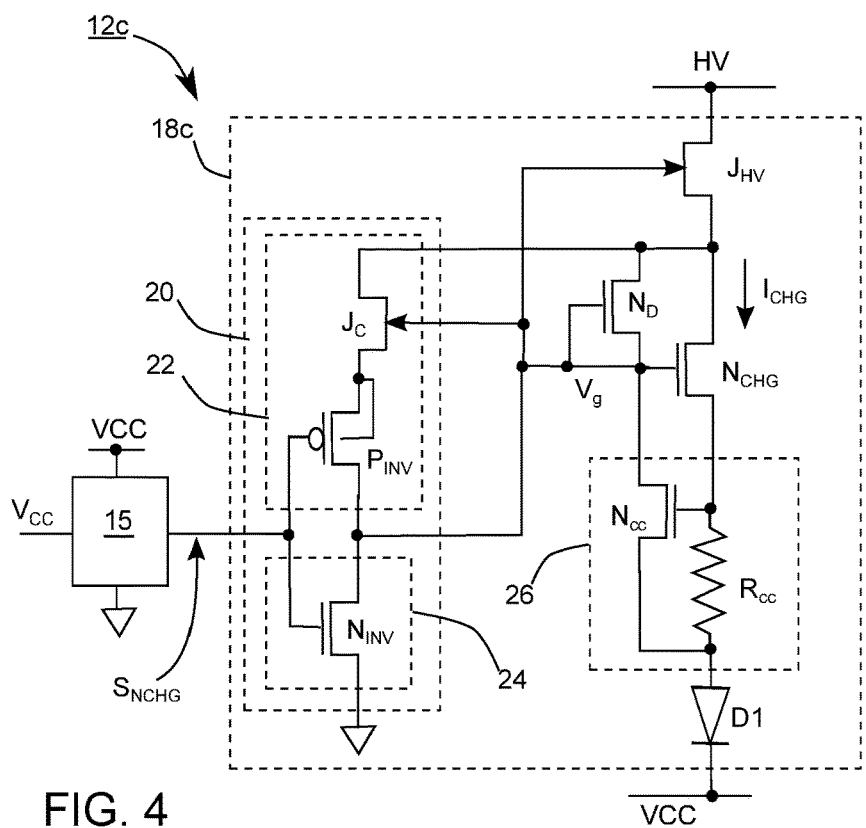

FIG. 4, according to embodiment of the invention, demonstrates power controller 12c, which, in comparison with power controller 12b in FIG. 3, additionally has NMOS transistor $N_{CC}$ and resistor $R_{CC}$. As shown in FIG. 4, NMOS transistor $N_{CC}$ and resistor $R_{CC}$ are connected to be constant-current controller 26 connected between NMOS transistor $N_{CHG}$ and operating voltage pin VCC. Constant-current controller 26 constrains charging current $I_{CHG}$ under a predetermined amount equal to the ratio of the threshold voltage of NMOS transistor $N_{CC}$ to the resistance of resistor $R_{CC}$. High-voltage startup circuit 18c in power controller 12c could also enjoy both high-speed transient response and low standby power consumption.

Figure 5:
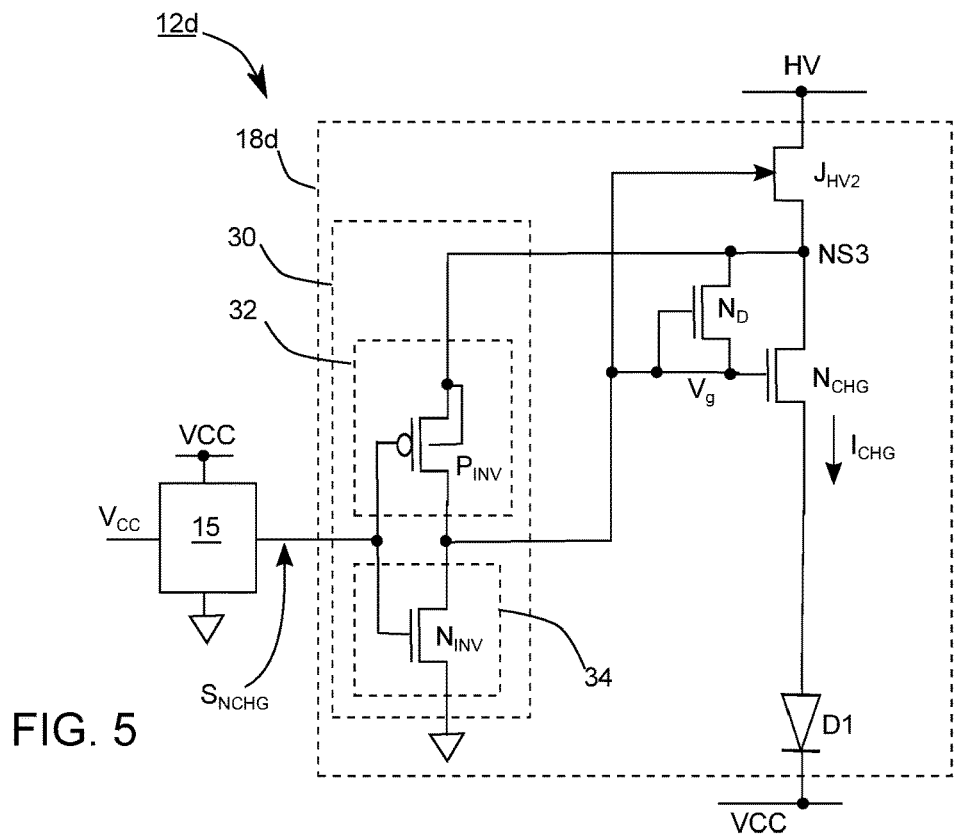

FIG. 5 demonstrates power controller 12d, which, according to one embodiment of the invention, is an integrated circuit and replaces power controller 12 in FIG. 1. Power controller 12d has high-voltage startup circuit 18d and startup controller 15. High-voltage startup circuit 18d includes JFET $J_{HV2}$, NMOS transistors $N_{CHG}$, $N_D$ and $N_{INV}$, PMOS transistor $P_{INV}$, and diode D1, connection of which is shown in FIG. 5. JFET $J_{HV2}$ and NMOS transistor $N_{CHG}$ are connected in series via joint node NS3 between high-voltage pin HV and operating voltage pin $V_{CC}$. Startup controller 15, while powered by operating voltage $V_{CC}$, detects operating voltage $V_{CC}$. Several portions in FIG. 5 are similar with or the same with corresponding portions in FIG. 3 or 4, and their functions and operations could be understood from the teaching regarding to FIGS. 3 and 4 without further explanation.

NMOS transistor $N_{INV}$ and POMS transistor $P_{INV}$, as being connected, act as inverter 30 receiving stop signal $S_{NCHG}$ from startup controller 15 to control the gate of NMOS transistor $N_{CHG}$. POMS transistor $P_{INV}$ alone is deemed as pull-up circuit 32 for pulling up gate voltage $V_g$ at the gate of NMOS transistor $N_{CHG}$, while NMOS transistor $N_{INV}$ pull-down circuit 34 for pulling down gate voltage $V_g$.

According to the embodiment of FIG. 5, JFET $J_{HV2}$ is an ultra-high voltage transistor capable of sustaining an input voltage higher than 400V, and the threshold voltage of JFET $J_{HV2}$ is about 5V. According to some embodiments of the invention, all NMOS and PMOS transistors inside high-voltage startup circuit 18d are high-voltage devices each capable of sustaining a voltage drop up to 30V.

In FIG. 5, when startup controller 15 finds operating voltage $V_{CC}$ becomes less than a predetermined bottom limit $V_{BTM}$, 10V for example, startup controller 15 de-asserts stop signal $S_{NCHG}$, making its logic level about 0V, so as to turn off NMOS transistor $N_{INV}$ and turn on PMOS transistor $P_{INV}$. As a result, pull-up circuit 32, now having turned-on PMOS transistor $P_{INV}$, provides a conductive path to couple joint node NS3 to the gate of NMOS transistor $N_{CHG}$, so NMOS transistor $N_{CHG}$ is turned ON accordingly. Meanwhile, NMOS transistor $N_{INV}$ is turned OFF, pull-down circuit 34 performing an open circuit. JFET $J_{HV2}$ is turned ON as its source is connected to its gate by pull-up circuit 32. Charging current $I_{CHG}$ originates from line voltage $V_{LINE}$ in FIG. 1, flows through resistor $R_S$ in FIG. 1, then goes via in FIG. 5 high-voltage pin HV, JFET $J_{HV2}$, NMOS transistor $N_{CHG}$, diode D1, and operating voltage pin $V_{CC}$, and finally charges operating voltage capacitor C1 in FIG. 1, performing high-voltage charging. Operating voltage $V_{CC}$ ramps up accordingly as high-voltage charging continues.

When startup controller 15 in FIG. 5 asserts stop signal $S_{NCHG}$, making its logic level about 5V, NMOS transistor $N_{INV}$ turns ON and the current flowing through PMOS transistor $P_{INV}$ is reduced, causing the decrease of gate voltage $V_g$. When Gate voltage $V_g$ is low enough, NMOS transistor $N_{CHG}$ turns off, charging current $I_{CHG}$ stops, so does high-voltage charging.

JFET $J_{HV2}$ has a threshold voltage of 5V, substantially no more than the logic level stop signal $S_{NCHG}$ has when stop signal $S_{NCHG}$ is asserted. In other words, when stop signal $S_{NCHG}$ has logic level of 5V, asserted, JFET $J_{HV2}$ makes the voltage at joint node NS3 no higher than 5V, so PMOS transistor $P_{INV}$ is firmly turned OFF, decoupling joint node NS3 from the gate of NMOS transistor $N_{CHG}$.

High-voltage startup circuit 18d in FIG. 5 could have very low standby power consumption when stop signal $S_{NCHG}$ is asserted and high-voltage charging stops. As high-voltage charging stops, joint node NS3 stays at about 5V. JFET $J_{HV2}$ and PMOS transistor $P_{INV}$ both turn OFF, so pull-up circuit 32 becomes an open circuit, decoupling the gate of NMOS transistor $N_{CHG}$ from joint node NS3. Pull-down circuit 34, having NMOS transistor $N_{INV}$ turned ON, pulls gate voltage V, down to about 0V, stopping high-voltage charging. The fact that JFET $J_{HV2}$, NMOS transistor $N_{CHG}$ and PMOS transistor $P_{INV}$ are all in the state of turning OFF proves no standby power consumption except the leakage current of turned-off devices.

Increasing the driving ability of PMOS transistor $P_{INV}$ increases the transient response of high-voltage startup circuit 18d for starting high-voltage charging while it has nothing to do with the standby power consumption of high-voltage startup circuit 18d when high-voltage charging stops. Therefore, it is possible for high-voltage startup circuit 18d to enjoy both high-speed transient response and low standby power consumption.

Figure 6:
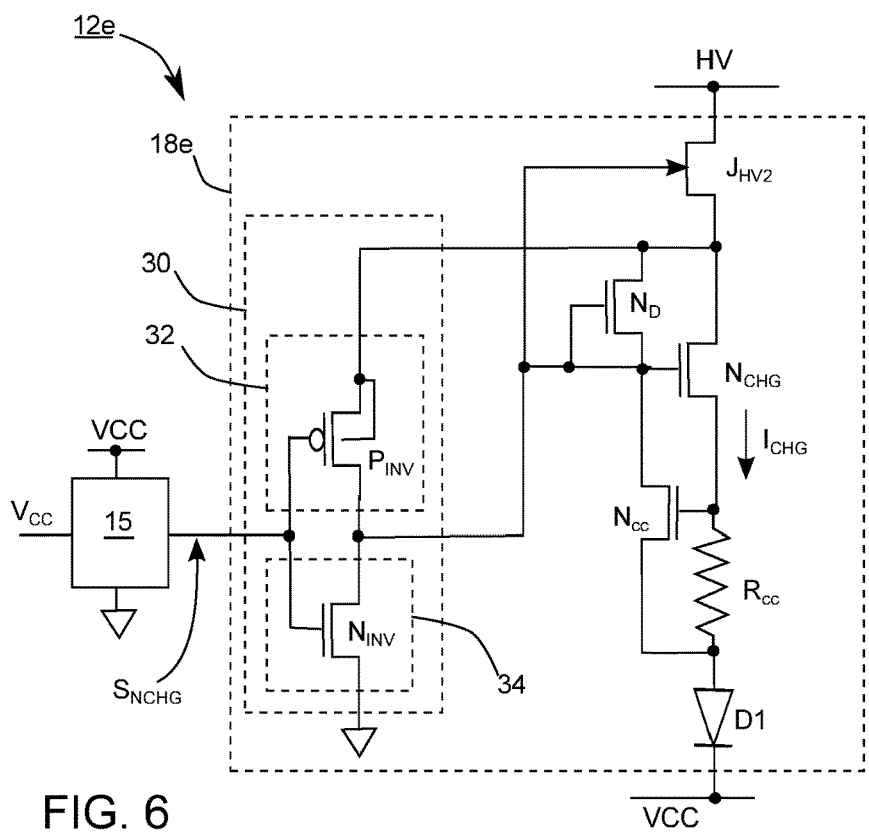

FIG. 6, according to embodiment of the invention, demonstrates power controller 12e, which, in comparison with power controller 12d in FIG. 5, additionally has NMOS transistor $N_{CC}$ and resistor $R_{CC}$. High-voltage startup circuit 18e in power controller 12c could also enjoy both high-speed transient response and low standby power consumption.

Even though the aforementioned examples embody the invention in a flyback power converter, but the invention is not limited to. Embodiments of the invention could be implemented in, for example, boost converters, buck converters, or LLC resonant converters.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A high-voltage startup circuit formed in an integrated circuit with a high-voltage pin and an operating voltage pin, the high-voltage startup circuit comprising:
    a main NMOS transistor with a first gate;
    an ultra-high voltage transistor capable of sustaining an input voltage higher than 400V, wherein the ultra-high voltage transistor is connected in series with the main NMOS transistor via a joint node between the high-voltage pin and the operating voltage pin; and
    an inverter for receiving a stop signal to control the first gate, comprising:
        a pull-up circuit connected between the joint node and the first gate, and controlled by the stop signal for pulling high a first gate voltage at the first gate; and
        a pull-down circuit controlled by the stop signal for pulling down the first gate voltage of the first gate;
    wherein, when the stop signal is de-asserted, the pull-up circuit couples the joint node to the first gate and the pull-down circuit performs a first open circuit operation causing a charging current to flow from the high-voltage pin, through the ultra-high voltage transistor and the main NMOS transistor, to increase an operating voltage at the operating voltage pin; and
    when the stop signal is asserted, the pull-up circuit performs a second open circuit and the pull-down circuit pulls down the first gate voltage to turn OFF the main NMOS transistor and stop the charging current.

2. The high-voltage startup circuit as claimed in claim 1, wherein the pull-up circuit comprises a PMOS transistor connected between the first gate and the joint node.

3. The high-voltage startup circuit as claimed in claim 2, wherein the pull-up circuit further comprises a JFET connected between the PMOS transistor and the joint node.

4. The high-voltage startup circuit as claimed in claim 3, wherein the JFET comprises a second gate connected to the first gate.

5. The high-voltage startup circuit as claimed in claim 3, wherein the JFET has a threshold voltage substantially no more than a logic level that the stop signal has when the stop signal is asserted.

6. The high-voltage startup circuit as claimed in claim 2, wherein the PMOS transistor has a body shorted to a source of the PMOS transistor.

7. The high-voltage startup circuit as claimed in claim 1, wherein the ultra-high voltage transistor has a second gate connected to the first gate.

8. The high-voltage startup circuit as claimed in claim 7, wherein the ultra-high voltage transistor is a JFET.

9. The high-voltage startup circuit as claimed in claim 8, wherein the pull-up circuit comprises a PMOS transistor connected between the first gate and the joint node, and the ultra-high voltage transistor has a threshold voltage substantially no more than a logic level the stop signal has when the stop signal is asserted.

10. The high-voltage startup circuit as claimed in claim 1, further comprising:
   a constant-current controller, connected between the main NMOS transistor and the operating voltage pin, for constraining the charging current under a predetermined amount.

11. A control method for high-voltage charging, in use of a high-voltage startup circuit comprising a ultra-high voltage transistor and a main NMOS transistor, wherein the main NMOS transistor has a first gate, the ultra-high voltage transistor is capable of sustaining an input voltage higher than 400V, and the ultra-high voltage transistor is connected in series with the main NMOS transistor via a joint node between a high-voltage pin and an operating voltage pin, the control method comprising:
   coupling the joint node to the first gate to turn ON the main NMOS transistor, so as to make a charging current flow through the high-voltage pin, the ultra-high voltage transistor, the main NMOS transistor and the operating voltage pin to increase an operating voltage at the operating voltage pin; and
   decoupling the joint node from the first gate and pulling down a first gate voltage of the first gate, so as to turn OFF the main NMOS transistor and stop the charging current.

12. The control method as claimed in claim 11, wherein the ultra-high voltage transistor has a second gate, the control method further comprising:
   connecting the second gate to the first gate.

13. The control method as claimed in claim 11, comprising:
   providing a PMOS transistor connected between the first gate and the joint node; and
   making a source voltage of the PMOS transistor no more than a gate voltage of the PMOS transistor when the main NMOS transistor is turned off.

14. The control method as claimed in claim 13, further comprising:
   providing a JFET connected between the PMOS transistor and the joint node, wherein the JFET has a second gate; and
   connecting the second gate to the first gate.

15. The control method as claimed in claim 11, comprising:
   constraining the charging current under a predetermined amount.

* * * * *